US009244908B2

(12) United States Patent
Kim et al.

(10) Patent No.: US 9,244,908 B2
(45) Date of Patent: Jan. 26, 2016

(54) GENERATION OF A SEMANTIC MODEL FROM TEXTUAL LISTINGS

(75) Inventors: Doo Soon Kim, Los Gatos, CA (US); Peter Z. Yeh, San Jose, CA (US); Kunal Verma, Sunnyvale, CA (US)

(73) Assignee: Accenture Global Services Limited, Dublin (IE)

( * ) Notice: Subject to any disclaimer, the term of this patent is extended or adjusted under 35 U.S.C. 154(b) by 309 days.

(21) Appl. No.: 13/593,778

(22) Filed: Aug. 24, 2012

(65) Prior Publication Data
US 2013/0262086 A1 Oct. 3, 2013

Related U.S. Application Data

(60) Provisional application No. 61/616,384, filed on Mar. 27, 2012.

(51) Int. Cl.
*G06F 17/27* (2006.01)
*G06Q 30/02* (2012.01)

(52) U.S. Cl.
CPC ........ *G06F 17/2785* (2013.01); *G06F 17/2705* (2013.01); *G06Q 30/0256* (2013.01)

(58) Field of Classification Search
CPC ..... G06F 17/2705; G06F 17/28; G06F 17/30; G06Q 30/0256
USPC ............................................ 704/9; 705/14.54
See application file for complete search history.

(56) References Cited

U.S. PATENT DOCUMENTS

| 5,680,628 | A | * | 10/1997 | Carus et al. ........................ 704/1 |
| 6,081,774 | A | * | 6/2000 | de Hita et al. ...................... 704/9 |
| 6,253,188 | B1 | * | 6/2001 | Witek et al. ................ 705/14.54 |
| 6,507,829 | B1 | * | 1/2003 | Richards et al. ................. 706/45 |
| 6,675,159 | B1 | * | 1/2004 | Lin et al. ................................ 1/1 |
| 6,915,308 | B1 | * | 7/2005 | Evans et al. ..................... 707/754 |
| 7,096,179 | B2 | * | 8/2006 | Zhu et al. .......................... 704/1 |
| 7,809,723 | B2 | * | 10/2010 | Liu et al. ........................ 707/736 |
| 2003/0040970 | A1 | * | 2/2003 | Miller ............................. 705/26 |
| 2007/0027749 | A1 | * | 2/2007 | Peiro et al. ....................... 705/14 |

OTHER PUBLICATIONS

Auer et al., "DBpedia: A Nucleus for a Web of Open Data", Proceedings of the 6th international the semantic web and 2nd Asian conference on Asian semantic web conference, pp. 722-735 (2007).

(Continued)

*Primary Examiner* — Shaun Roberts
(74) *Attorney, Agent, or Firm* — Harrity & Harrity, LLP

(57) ABSTRACT

A corpus of textual listings is received and main concept words and attribute words therein are identified via an iterative process of parsing listings and expanding a semantic model. During the parsing phase, the corpus of textual listings is parsed to tag one or more head noun words and/or one or more identifier words in each listing based on previously identified main concept words or using a head noun identification rule. Once substantially each listing in the corpus has been parsed in this manner, the expansion phase assigns head noun words as main concept words and modifier words as attribute words, where possible. During the next iteration, the newly identified main concept words and/or attribute words are used to further parse the listings. These iterations are repeated until a termination condition is reached. Remaining words in the corpus are clustered based on the main concept words and attribute words.

20 Claims, 4 Drawing Sheets

(56) References Cited

OTHER PUBLICATIONS

Baker et al., "The Berkeley FrameNet Project", Proceedings of the 36th Annual Meeting of the Association for Computational Linguistics and 17th International Conference on Computational Linguistics, vol. 1, pp. 86-90 (1998).

Beaufort et al., "A hybrid rule/model-based finite-state framework for normalizing sms messages", Proceedings of the $48^{th}$ Annual Meeting of the Association for Computational Linguistics, pp. 770-779 (2010).

Bollacker et al., "Freebase: A Collaboratively Created Graph Database for Structuring Human Knowledge", Proceedings of the 2008 ACM SIGMOD international conference on Management of data, pp. 1247-1250 (2008).

Chambers et al., "Template-Based Information Extraction without the Templates", Proceedings of the $49^{th}$ Annual Meeting of the Association for Computational Linguistics: Human Language Technologies, vol. 1, pp. 976-986 (2011).

Chang et al., "Guiding Semi-Supervision with Constraint-Driven Learning", Proceedings of the $45^{th}$ Annual Meeting of the Association of Computational Linguistics, pp. 280-287, Jun. 2007.

Chen et al., "In-domain Relation Discovery with Meta-Constraints via Posterior Regularization", Proceedings of the 49th Annual Meeting of the Association for Computational Linguistics: Human Language Technologies, vol. 1, pp. 530-540 (2011).

Ghani et al., "Text Mining for Product Attribute Extraction", SIGKDD Explorations, vol. 8, Issue 1, pp. 41-48, Jun. 2006.

Grenager et al., "Unsupervised Learning of Field Segmentation Models for Information Extraction", Proceedings of the $43^{rd}$ Annual Meeting of the ACL, pp. 371-378, Jun. 2005.

Gruhl et al., "Context and Domain Knowledge Enhanced Entity Spotting in Informal Text", Proceedings of the $8^{th}$ International Semantic Web Conference, pp. 260-276 (2009).

Haghighi et al., "Prototype-Driven Learning for Sequence Models", Proceedings of the Human Language Technology Conference of the North American Chapter of the ACL, pp. 320-327, Jun. 2006.

Lin et al., "DIRT—Discovery of Inference Rules from Text", Proceedings of the 7th ACM SIGKDD international conference on Knowledge discovery and data mining, pp. 323-328 (2001).

Liu et al., "Recognizing Named Entities in Tweets", Proceedings of the $49^{th}$ Annual Meeting of the Association for Computational Linguistics: Human Language Technologies, vol. 1, pp. 359-367 (2011).

Michelson et al., "Semantic Annotation of Unstructured and Ungrammatical Text", Proceedings of the $19^{th}$ International Joint Conference on Artificial Intelligence, pp. 1091-1098 (2005).

Michelson et al., "Exploiting Background Knowledge to Build Reference Sets for Information Extraction", Proceedings of the 21st International Joint Conference on Artificial Intelligence, pp. 2076-2082 (2009).

Poon et al, "Joint Inference in Information Extraction", Proceedings of the $22^{nd}$ National Conference on Artificial Intelligence, vol. 1, pp. 913-918, (2007).

Poon et al., "Unsupervised Ontology Induction from Text", Proceedings of the 48th Annual Meeting of the Association for Computational Linguistics, pp. 296-305 (2010).

Putthividhya et al., "Bootstrapped Named Entity Recognition for Product Attribute Extraction", Proceedings of the Conference on Empirical Methods in Natural Language Processing, pp. 1557-1567 (2011).

Reisinger et al., "Fine-Grained Class Label Markup of Search Queries", Proceedings of the $49^{th}$ Annual Meeting of the Association for Computational Linguistics, Human Language Technologies, vol. 1, pp. 1200-1209, Jun. 19-24, 2011.

Sarawagi et al., "Semi-Markov Conditional Random Fields for Information Extraction", Appears in Advances in Neural Information Processing Systems 17, pp. 1185-1192 (2004).

Sekine, "On-Demand Information Extraction", Proceedings of the COLING/ACL on Main Conference Poster Sessions, pp. 731-738 (2006).

Tsuruoka et al., "Bidirectional Inference with the Easiest-First Strategy for Tagging Sequence Data", Proceedings of Human Language Technology Conference and Conference on Empirical Methods in Natural Language Processing, pp. 467-474, Oct. 2005.

Turney et al., "From Frequency to Meaning: Vector Space Models of Semantics", Journal of Aritificial Intelligence Research 37, pp. 141-188, Feb. 2010.

Winkler et al., "String Comparator Metrics and Enhanced Decision Rules in the Fellegi-Sunter Model of Record Linkage", Proceedings of the Section on Survey Research, pp. 354-359 (1990).

\* cited by examiner

GENERATION OF A SEMANTIC MODEL FROM TEXTUAL LISTINGS

CROSS-REFERENCE TO RELATED APPLICATION

The instant application claims the benefit of Provisional U.S. Patent Application Ser. No. 61/616,384 entitled "Systems and Methods for Extracting and Integrating Unstructured Content with Structured Data" and filed Mar. 27, 2012, the entirety of which is incorporated herein by this reference.

FIELD

The instant disclosure relates generally to semantic models as used in information extraction and, in particular, to the generation of semantic models based on textual listings.

BACKGROUND

With the rapid growth of the Internet and World Wide Web, there has been an equally rapid growth in the number of textual listings available. As used herein, a textual listing is a comparatively short text (typically around 10 words in length) often, but not always, having highly idiosyncratic and/or ungrammatical styles. Such listings are usually informally produced and therefore often have typos or rely heavily on abbreviations. Typical examples include classified ads, product listings, tenders, etc., as shown in Table 1 below.

TABLE 1

| DOMAIN | EXAMPLE |
| --- | --- |
| Rental housing advertisement | 2x2 Quiet Cozy Charming Single Family Home - 1515 Martin Avenue |
| Used sports goods | NikeBaseball Gloves Black 12" LHT |
| Deal information for electronics goods | Panasonic 32" 1080p LCD TV - $329 @ Best-Buy |

As textual listings are expected to continue in growth, it is understood that improvement in a machine's reasoning capability will be strongly tied to the ability to extract information from such listings. For example, consider an online shopping site listing a wide variety of information about offered merchandise; detecting brands/styles/features that are frequently mentioned on the postings would allow a company to design a better marketing strategy. To this end, it is known in the art to develop so-called semantic models in which symbols (e.g., words or tokens) are stored along with information about what those symbols mean in the "real world." In effect, using such semantic models, machines are able to effectively understand the data being processed and, therefore, perform such processing more efficiently, more accurately and with less human intervention.

Most information extraction techniques developed for formal texts, however, would be inapplicable to textual listings because of their informal and idiosyncratic styles. To address these challenges, several approaches have been proposed to apply machine learning algorithms or an external knowledge base. These approaches, however, commonly require human supervision to produce training data or to build a knowledge base. An example of such a system 100 is illustrated in FIG. 1. As shown, an information extraction component 102 operates upon a text corpus 108 based on a form of a semantic model comprising dictionaries 104 and rules 106 that are generated through user input 110, i.e., using manual assessment of at least some portion of the text corpus 108. For example, the dictionaries 104 typically include semantic data for specific words (e.g., "Companies=Samsung, LG, Sony, Apple . . . ") whereas the rules 106 set forth specific patterns associated with the information of interest (e.g., "Company='manufactured by _____', '_____ is a company', 'companies including _____', etc.). Being manually generated through analysis of the text corpus 108, such dictionaries and rules are expensive to develop. Substantially multiplying this expense is the fact that these efforts must be repeated for each new domain or set of information to be analyzed.

Thus, it would be preferable to provide techniques that permit the rapid and accurate development of semantic models based on textual listings, while minimizing the need for human input in the development of such semantic models.

SUMMARY

The instant disclosure describes techniques for generating semantic models based on textual listings. To this end, a processing device receive a corpus of textual listings and identifies main concept words and attribute words in the corpus to provide at least a portion of a semantic model. In one embodiment, the processing device first tokenizes the words in the corpus. For ease of illustration, it is noted that the instant specification uses "words" and "tokens" interchangeably as it is understood that the techniques described herein can operate on either. Additionally, user input in the form of seed main concept words and/or seed attribute words may be provided. In order to identify the main concept words and attribute words, an iterative process of parsing listings and expanding the semantic model is employed. During the parsing phase, the corpus of textual listings is parsed to tag one or more head noun words and/or one or more identifier words in each listing. This may be done by tagging previously identified main concept words in a listing as head noun words or using a head noun identification rule. In an embodiment, prior to such parsing, it is first determined whether a given listing is parsable. Once parsing of each listing in the corpus has been attempted, the expansion phase assigns head noun words as main concept words and modifier words as attribute words, where possible. During the next iteration, then, the newly identified main concept words and/or attribute words are used to further parse the listings. These iterations are repeated until a termination condition is reached.

While the main concept words and attribute words used in this manner could serve as at least a portion of a suitable semantic model, in an embodiment, further processing is performed by the processing device whereby words in the corpus of listings are clustered based on the identified main concept words and attribute words, thereby further refining the semantic model. Regardless, the resulting semantic model may be used to perform information extraction on at least another corpus of textual listings.

BRIEF DESCRIPTION OF THE DRAWINGS

The features described in this disclosure are set forth with particularity in the appended claims. These features will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 1:
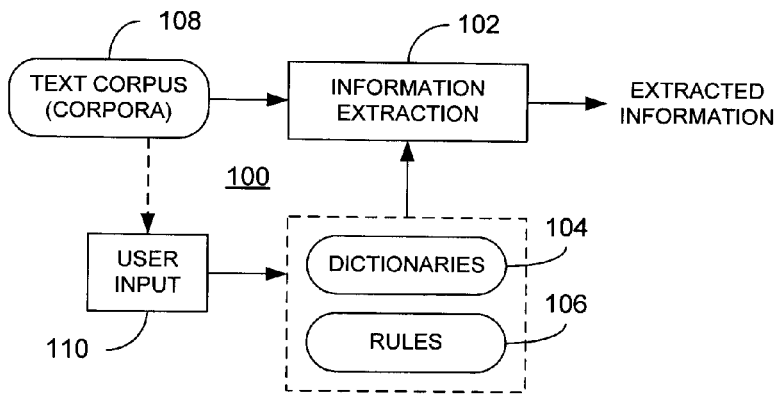
FIG. 1 is a block diagram of an example system for performing information extraction based on a semantic model in accordance with prior art techniques.
Figure 2:
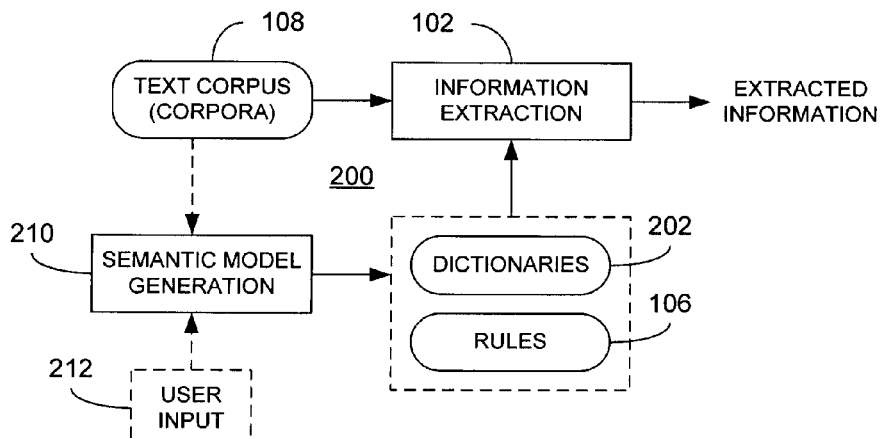
FIG. 2 is a block diagram of an example system for performing information extraction based on semantic model in accordance with the teachings of the instant disclosure.

Referring now to FIG. 2, a system 200 is illustrated. As shown, the system 200 comprises elements identical to that shown in FIG. 1, as indicated by like reference numerals, but also comprises a semantic model generation component 210 that provides at least a portion of the semantic model used by the information extraction component 102, specifically one or more dictionaries 202. As described in greater detail below, the semantic model generation component 210 is capable of operating in an unsupervised (i.e., without user intervention) mode or a semi-supervised (i.e., with partial user involvement) mode through incorporation of user input 212 when generating semantic models based on text corpora. In an embodiment, an example of a semantic model generated by the semantic model generation component 210 is illustrated with reference to FIG. 3.

Figure 3:
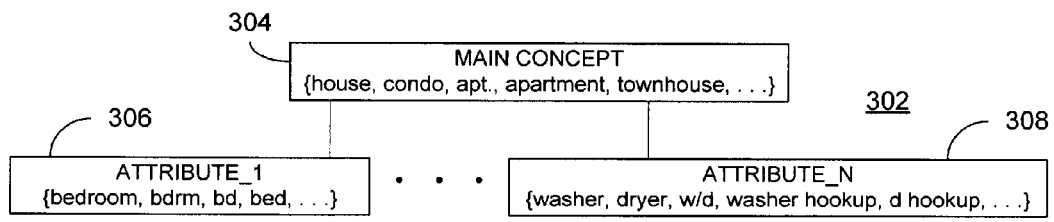
FIG. 3 is a schematic illustration of an example of at least a portion of a semantic model in accordance with the teachings of the instant disclosure.

A feature of most listings is that they typically describe the attributes of a single object, referred to herein as a main concept and its attributes. A main concept is the primary subject or focus of a given listing, i.e., the reason the listing was provided in the first place. An attribute is a quality or characteristic of the main concept and typically describes some feature of the main concept. Thus, a semantic model generated in accordance with the instant disclosure may have the form illustrated in FIG. 3. As shown, the semantic model 302 comprises words or tokens that are representative of at least one main concept 304 and any number of attributes 306, 308 associated with that main concept. Although a single instance of a main concept and its attributes is shown in FIG. 3 for ease of illustration, it will be appreciated that, in practice, a semantic model may (and typically will) comprise a number of main concepts and associated attributes. In an embodiment described below, the main concepts 304 and attributes 306, 308 in the semantic model 302 may comprise a cluster of words, each of which is representative of that main concept or attribute. Thus, in the illustrated example, which pertains to the domain of rental property listings, the main concept 304 includes words such as house, condo, apt. apartment, townhouse, etc. Likewise, the first attribute 306 comprises words bedroom, bdrm, bd, bed, etc., whereas the n-th attribute 308 comprises the words washer, dryer, w/d, washer hookup, d hookup, etc. Accordingly, the illustrated semantic model 302 captures the understanding that, for example, an "apartment" may have features such as a "bedroom" and a "washer hookup." Although the semantic model 302 in FIG. 3 pertains to a specific domain, it will be appreciated that the main concept/attributes schema employed herein can be applied to a very wide variety of domains and the teachings of the instant disclosure are not limited to any particular domain.

While attributes may be generally defined within a semantic model as suited to the application at hand, in an embodiment, specific types of attributes may be defined, particularly quantitative attributes and qualitative attributes. Quantitative attributes capture numeric values (e.g. 1 bedroom, 150 Hz, 70 kg, etc.), and are generally a number followed by a word indicating the attribute (e.g., unit of measurement). Qualitative attributes capture general characteristics about the main concept that are not generally susceptible to quantitative representation (e.g., address, included features, condition, etc.). In an embodiment, the type of an attribute is determined by analyzing the immediate preceding words throughout the corpus. Thus, if the words immediately preceding a given attribute are predominantly numbers throughout the corpus, the attribute is regarded as a quantitative attribute. Otherwise, it is regarded as a qualitative attribute.

As noted above, operation of the semantic model generation component 210 may be beneficially performed in an unsupervised manner, thereby reducing the costs associated with generating a semantic model. As further noted, however, user input 212 may nonetheless be incorporated into the generation of a semantic model, albeit, in less than a fully manual implementation. In particular, in one embodiment, the user input 212 may comprise main concept seeds and/or attribute seeds used to initiate discovery of further main concepts and attributes, as described in greater detail below. In yet another embodiment, user input 212 may be used to facilitate active learning in the model generation process. As known in the art of machine learning, active learning is a technique whereby a machine seeking to label data can request input from a user to label specific instances of data. For example, in those instances where the machine encounters ambiguity how to label a particularly frequent data point, well-known active learning techniques would cause the machine to query a user to disambiguate only that data point (or a small subset of similarly frequent and ambiguous data points), thereby speeding up the process of learning without requiring complete supervision by the user. In the context of the instant disclosure, such active learning could be employed where a given word possesses relatively equal characteristics of a main concept and an attribute (as described below), and the system would benefit from a domain expert providing a decision how to label the word accordingly.

Figure 4:
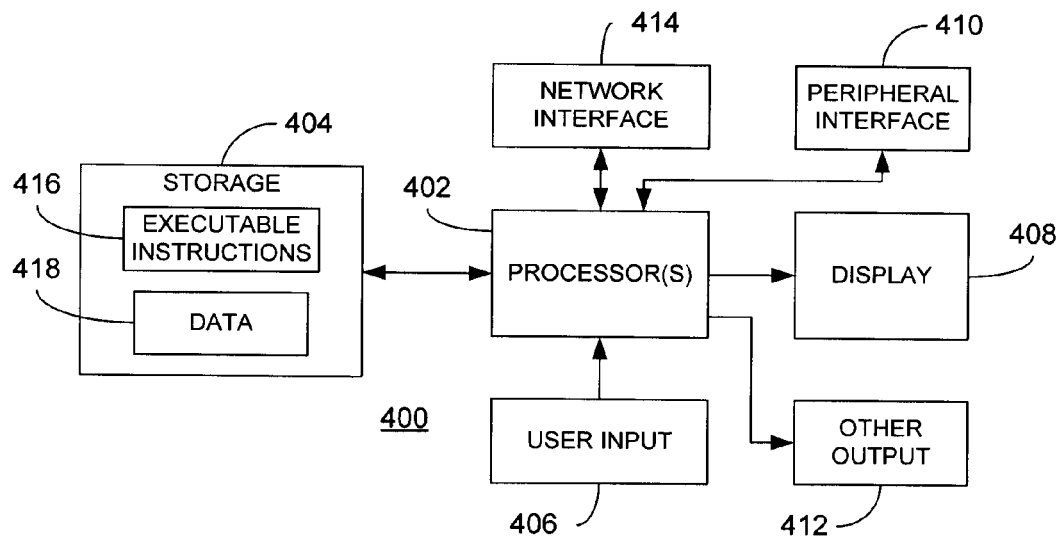
FIG. 4 is a block diagram of an example processing device that may be used to implement various embodiments in accordance with the teachings of the instant disclosure.
Figure 5:
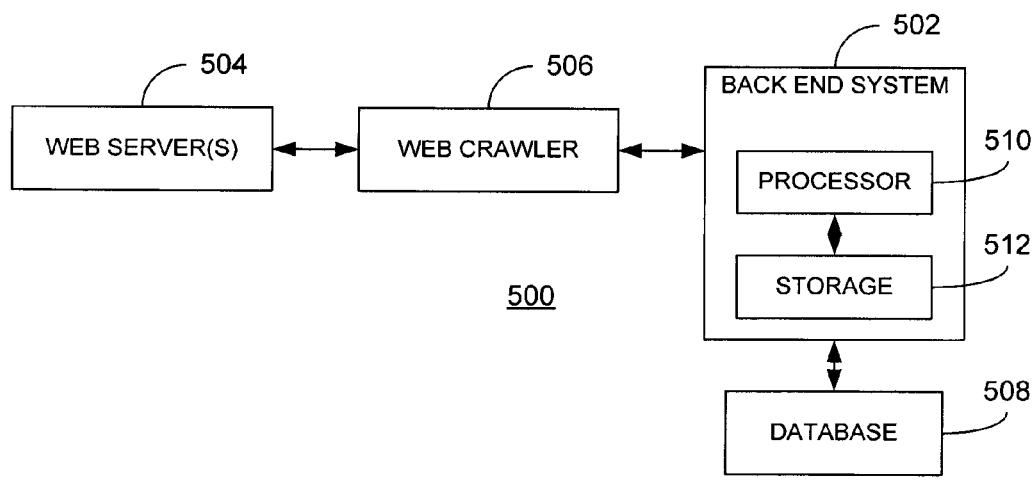
FIG. 5 is a block diagram of an example system that may be used to implement various embodiments in accordance with the teachings of the instant disclosure.

FIGS. 4 and 5 illustrate various embodiments of devices and systems that may be used to implement some or all of the components illustrated in FIG. 2. More particularly, FIG. 4 illustrates a representative processing device 400 that may be used to implement the teachings of the instant disclosure. The device 400 may be used to implement, for example, the entire system 200 of FIG. 2 or just the semantic model generation component 210. Regardless, the device 400 comprises a processor 402 coupled to a storage component 404. The storage component 404, in turn, comprises stored executable instructions 416 and data 418. In an embodiment, the processor 402 may comprise one or more of a microprocessor, microcontroller, digital signal processor, co-processor or the like or combinations thereof capable of executing the stored instructions 416 and operating upon the stored data 418. Likewise, the storage component 404 may comprise one or more devices such as volatile or nonvolatile memory including but not limited to random access memory (RAM) or read only memory (ROM). Further still, the storage component 404 may be embodied in a variety of forms, such as a hard drive, optical disc drive, floppy disc drive, etc. Processor and storage arrangements of the types illustrated in FIG. 4 are well known to those having ordinary skill in the art. In one embodiment, the processing techniques described herein are implemented as a combination of executable instructions and data within the storage component 404. For example, the stored data 418 may comprise the text corpus (or corpora) 218 as well as the full or partial semantic model used by the information extraction component 102.

As shown, the device 400 may comprise one or more user input devices 406, a display 408, a peripheral interface 410, other output devices 412 and a network interface 414 in communication with the processor 402. The user input device 406 may comprise any mechanism for providing user input (such as inputs specifying seed inputs or active learning inputs, etc. as described herein) to the processor 402. For example, the user input device 406 may comprise a keyboard, a mouse, a touch screen, microphone and suitable voice recognition application or any other means whereby a user of the device 400 may provide input data to the processor 402. The display 408, may comprise any conventional display mechanism such as a cathode ray tube (CRT), flat panel display, or any other display mechanism known to those having ordinary skill in the art. In an embodiment, the display 308, in conjunction with suitable stored instructions 316, may be used to implement a graphical user interface whereby a user may specify specific input files embodying the text corpus being operated upon and/or output files in which to store the resulting semantic model. Implementation of a graphical user interface in this manner is well known to those having ordinary skill in the art. The peripheral interface 410 may include the hardware, firmware and/or software necessary for communication with various peripheral devices, such as media drives (e.g., magnetic disk or optical disk drives), other processing devices or any other input source used in connection with the instant techniques. Likewise, the other output device(s) 412 may optionally comprise similar media drive mechanisms, other processing devices or other output destinations capable of providing information to a user of the device 400, such as speakers, LEDs, tactile outputs, etc. Finally, the network interface 414 may comprise hardware, firmware and/or software that allows the processor 402 to communicate with other devices via wired or wireless networks, whether local or wide area, private or public, as known in the art. For example, such networks may include the World Wide Web or Internet, or private enterprise networks, as known in the art.

While the device 400 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the device 400 may include a greater or lesser number of components than those illustrated. Once again, those of ordinary skill in the art will appreciate the wide number of variations that may be used is this manner. Further still, although a single processing device 400 is illustrated in FIG. 4, it is understood that a combination of such processing devices may be configured to operate in conjunction (for example, using known networking techniques) to implement the teachings of the instant disclosure.

Referring now to FIG. 5, a system 500 that may be used to implement one or more of the various instant embodiments is further illustrated. In particular, a back end system 502 is coupled to a database 508. As shown, the back end system 502 comprises at least one processor (such as a microprocessor, microcontroller, digital signal processor, etc. or combinations thereof) coupled to a storage device 512 (such as random-access memory, read-only memory, optical and/or magnetic storage devices, etc.) having stored thereon executable instructions that may be executed by the at least one processor. Generally, the back end system 506 may comprises one or more processing devices, such as that shown in FIG. 4, suitably programmed to perform the techniques described herein. As before, however, such processing devices may incorporate, or be replaced by, specialized processing circuits such as programmable logic arrays, application-specific integrated circuits, etc. as a matter of design choice. Although not shown, the back end system 502 may comprise a display and other user input/output devices, as known in the art, that allow a user of the back end system 502 to interact with and otherwise control processing in accordance with the instant disclosure.

In an embodiment, the corpus (or corpora) of textual listings may be obtained via a public communications network such as the World Wide Web in the form of textual content in web pages. Such content typically resides on one or more web servers 504 coupled to the back end 502 using conventional techniques. Web servers are well known to those having skill in the art. When gathering the textual listings, a so-called web crawler 506 (i.e., a computer-executed program that visits remote sites and automatically downloads their contents) programmed to visit websites of relevant entities and extract listings, may be used. Such a web crawler is preferably implemented using computer-programming techniques and may be programmed to automatically extract information or, in a simpler implementation, manually configured to extract specific information. As the web crawler collects suitable information (textual listings), they are stored in the database 508, which may comprise a suitably configured server computer. Of course, sources of documents other than web sites, such as internal databases or other non-publicly accessible sources may be equally employed. Further, it is not a requirement of the instant disclosure that textual listings be collected in this manner. For example, pre-compiled databases of such listings, obtained in other manners, may be equally employed.

Additionally, although not shown, the listings obtained by the system 500 may be pre-processed to remove any duplicate listings and any metadata (e.g., Hypertext Markup Language (HTML) expression or tags) from the textual listings. Techniques for cleaning textual listings in this manner are well known in the art and need not be described in detail here. Additionally, part of speech (POS) tagging may be used to label individual words or tokens in the listings. Once again, well-known techniques for performing such POS tagging may be used for this purpose. In an embodiment, because listings often lack proper grammatical structure, POS tags may be assigned to a given word by using the most frequent POS tag across all occurrences of that word.

Figure 6:
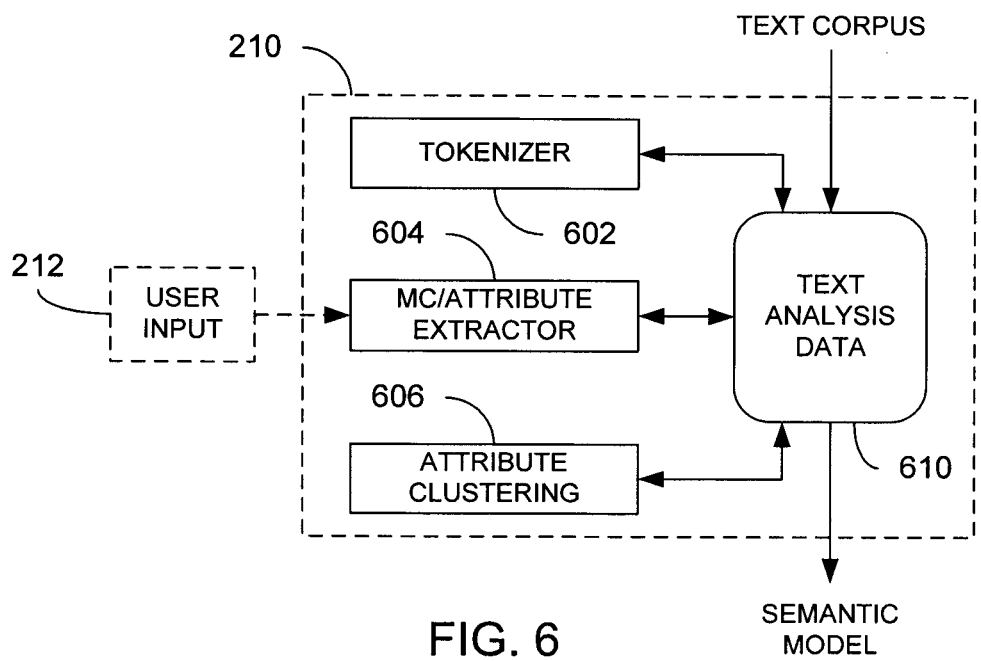
FIG. 6 is a block diagram illustrating in greater detail the generation of a semantic model in accordance with the teachings of the instant disclosure.

Referring now to FIG. 6, a block diagram illustrates, in greater detail, generation of a semantic model in accordance with the instant disclosure. In particular, the semantic model generation component 210 as illustrated comprises a tokenizer 602, a main concept/attribute extractor 604, a clustering component 606 and text analysis data storage 610. In an embodiment, at least a portion of the corpus of textual listings is provided to and stored in the text analysis data storage 610. As described below, the text analysis data storage 610 also stores any intermediate data resulting from the operation of the various components 602-606 on the text corpus.

It is often the case that normal spacing between (and spellings of) words may not be present given the informal nature of listings. To account for these idiosyncrasies, it is desirable to tokenize each listing, which is a process of breaking up a listing into a series of individual tokens through splitting and/or merging operations. For example, the listing "50 inch HDTV @BestBuy" can be separated into the tokens "50", "inch", "HDTV", "@", "Best Buy". To this end, the tokenizer 602 first analyzes a listing to identify individual tokens using spacing information. Techniques for doing this are well known in the art, e.g., character strings comprising one or more characters separated, at either end of the string, from other strings by a white space or a beginning/ending tag can be considered a token. Thus, using the above-noted example, the available spaces would result in the tokens "50 inch", "HDTV" and "@BestBuy". Additionally, customized rules may be used to accommodate particular features often found in listings. For example, alphanumeric tokens that begin with numbers may be spit up (e.g., "50 inch" to "50" and "inch"). Likewise, tokens comprising mixed cases can be split at the boundaries of different cases (e.g., "BestBuy" to "Best" and "Buy").

Proper tokens may sometimes require the inclusion of multiple words in the token. Such multiword tokens may arise in different ways. For example, if a bigram (e.g., "top floor") occurs with relatively high frequency across multiple listings as either a single token (e.g., "TopFloor") or dashed token (e.g., "top-floor"), the tokenizer 602 may regarding the bigram as a single multiword token. In another embodiment, the tokenizer 602 may recognize multiword tokens based on the tendency of two tokens appearing together when either one appears. Thus, generally, for each bigram, w1 w2 (excluding symbols and numbers), if the conditional probability of the bigram given either w1 or w2, i.e., p(w1 w2|w1) or p(w1 w2|w2), is relatively high (e.g. greater than 0.75), then the bigram is considered as a candidate multiword token. To further refine the results of such conditional probability testing, the tokenizer 602 may further assess, for each w2, the entropy over the distribution of the words in the w1 position. Here, the intuition is that high variability in the w1 position (i.e., high entropy) indicates that a potential multiword token is likely a breakable phrase that may be removed from such consideration. In an embodiment, the above-noted multiword token processing may be repeatedly applied to acquire multiword tokens of arbitrary length, for example, up to 4-gram multiword tokens. As shown, the tokens resulting from operation of the tokenizer 602 may be stored in the text analysis data store 610.

The main concept/attribute extractor 604 operates upon the words identified in the text corpus in order to extract (identify, label, etc.) main concept words and attribute words in the text corpus. Once again, for ease of illustration, it is noted that the instant specification uses "words" and "tokens" interchangeably as it is understood that the techniques described herein can operate on either. To this end, operation of the main concept/attribute extractor 604 is guided by the observation that main concepts tend to appear as head nouns in a listing, and attributes tend to appear as the modifiers of these head nouns in the listing. As used herein, a head noun is likely to be the last noun in a first noun phrase occurring in a listing. For example, in the listing "2 bedroom condo with indoor parking spot", this heuristic would identify "condo" as the main concept as it is the last noun in the first noun phrase, i.e., "2 bedroom condo". Further refining this approach, a head noun is likely to be found in a noun phrase that excludes a prepositional phrase. Stated another way, noun phrases that include adjectives and nouns are the best candidates for identifying head nouns. Referring again to the previous example, it is noted that there are two noun phrases—"2 bedroom condo" and "2 bedroom condo with indoor parking spot". Although both are legitimate noun phrases, the latter includes the prepositional phrase "with indoor parking spot." In this case, the noun phrase excluding a prepositional phrase, i.e., "2 bedroom condo" is considered the more likely candidate for identifying a head noun. As another example, and illustrating that a head noun is not always the last noun in the first noun phrase, consider the listing "house decorated with flowers." In this case, once again, there are two noun phrases—the single-word phrase "house" and "house decorated with flowers." Using the prepositional phrase exclusion heuristic, "house" would be properly identified as the head noun.

Figure 7:
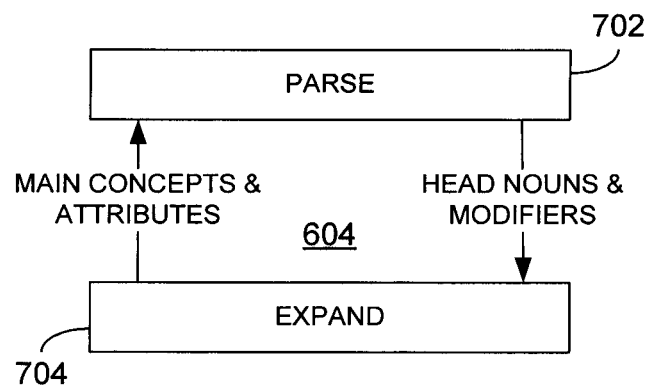
FIG. 7 is a schematic illustration of an iterative process used to generate a schematic model in accordance with the teachings of the instant disclosure.

As illustrated in FIG. 7, the main concept/attribute extractor 604 uses an iterative process of a parsing phase 702 in which head nouns and modifiers are tagged based in part upon previously identified main concept words and/or a head noun identification rule, followed by an expansion phase 704 in which main concepts and attributes are identified based on the head noun and modifier tags. In essence, the parsing and expansion phases 702, 704 bootstrap off of each other to more fully develop the semantic model (i.e., the main concepts and attributes) with each complete iteration. A more detailed explanation of operation of the main concept/attribute extractor 604 is provided below in conjunction with FIG. 8.

The clustering component 606 further develops the semantic model (partially constructed by the main concept/attribute extractor 604) by clustering attribute words in the text corpus that are not included in the main concept words. As known in the art, for formal texts, distributional similarity has been widely used for word clustering because the contextual clues in formal texts strongly indicate whether words should be clustered. However, context alone is insufficient for textual listings because they lack the discriminative contexts given their short length. To address this, the clustering component 606 uses the following rules (listed in order of highest to lowest priority), based on general properties of listings, to augment context-based clustering.

As a first rule, two quantitative attribute tokens are prohibited to be clustered if they frequently appear in same listings. This is based on the observation that a quantitative attribute is likely to appear only once in a listing. For example, "bed" and "bath" are not clustered because they often appear together (such as "2 bed/2 bath"). To enforce this rule, for all pairs of tokens, t1 and t2, the clustering component 606 measures a conditional probability of the pair appearing in a same listing given either t1 or t2 appearing. If any of the conditional probabilities is relatively high, t1 and t2 are not clustered.

As a second rule, quantitative attribute tokens and qualitative attribute token are not clustered together.

As a third rule, two tokens are clustered if the characters in one token appear in the other, preserving the order (e.g., "bdrm" and "bedroom").

If the rules above fail to determine the similarity between two tokens, context-based similarity is employed to determine whether the tokens should be clustered. Thus, in an embodiment, for each word, the clustering component 606 defines a context vector with frequencies of context words (two right/left windows). For example, in the listing "Brentwood Apt. with 3 bedroom", the context words of "apt." are "1—start" (beginning of the listing), "1—brentwood", "r—with", "r—3", where "l" and "r" respectively indicate the left or right window. As known in the art, the frequencies in the vectors may also be weighted using PMI scores (pointwise mutual information) between the token and its context words because a high PMI indicates a context word is strongly associated with the token and is hence a discriminative feature. Further still, as known in the art, the clustering component 606 may also apply a smoothing function to alleviate the bias found in PMI scores toward infrequent events. A similarity score is then calculated using a cosine similarity measure between the two weighted vectors. Then, based on the similarity function, the clustering component 606 applies agglomerative clustering (with average linkage) to produce attribute clusters or to expand the main concept cluster. However, calculating similarity scores for all pairs of the tokens is expensive. To address this, clustering may be implemented in two steps. At the first step, agglomerative clustering is performed on the full pairs of high frequency tokens. Then, for each token having relatively low frequency, the similarity score between the token and each of the clusters is calculated. If the score is over a threshold, the token is added to the cluster. If the score is less than the threshold but still appears relatively frequently, a new cluster is created to include the token. Otherwise, the token is discarded from further consideration. It is noted that thresholds for determining comparatively high frequency and low frequency tokens, as well as similarity scores, may be selected as a matter of design choice.

Figure 8:
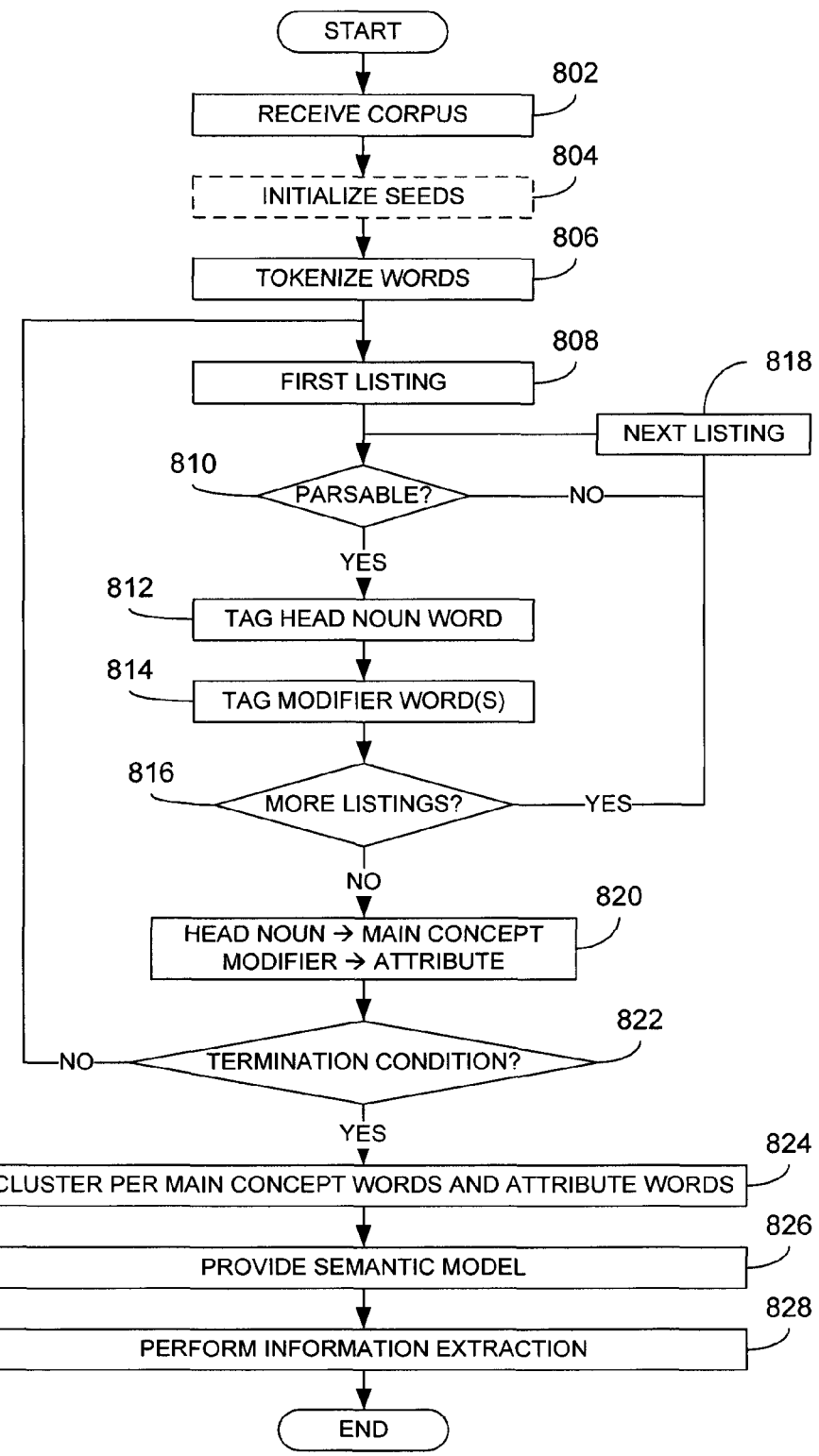
FIG. 8 is a flowchart illustrating an embodiment of processing in accordance with the teachings of the instant disclosure.

Referring now to FIG. 8, processing in accordance with the instant disclosure is further described. In an embodiment, the processing illustrated in FIG. 8 is performed by the semantic model generation component 210 and, where applicable, by the information extraction component 102 that, in turn, may be implemented by the processing device 400 and/or system 500 illustrated in FIGS. 4 and 5. Regardless, processing begins at block 802 where the corpus of textual listings is received. The above-noted preprocessing of the corpus can be performed as part of block 802 as well. Thereafter, processing may optionally continue at block 804, where various seed values may be initialized. For example, in an embodiment, attributes may be initialized through selection of words that are highly likely to be treated as attributes; specifically, words, that frequently appear as the object of a preposition within the corpus (e.g., "for rent", "with washer and dryer", "for baseball") are assigned as attributes. In another embodiment, user input may be received in which seed main concept words and/or seed attribute words are designated. Processing continues at block 806 where the received corpus is tokenized as described above. At this point, the corpus is ready to be analyzed.

In particular, FIG. 8 illustrates the above-noted iterative parsing (blocks 808-818) and expansion phases (block 820) in order to identify main concepts words and attribute words. Thus, at block 808, the first listing in the corpus is treated as the current listing and, at block 810, it is determined whether the current listing is parsable. In an embodiment, two criteria are used for this purpose. First, a listing is considered parsable if the listing does not contain a long sequence of nouns (e.g., seven or more words) without any prepositions (e.g., "worth shutout series 12" womens fastpitch softball fielders glove s0120 lefty"). Second, the listing is considered parsable if the majority (e.g., more than 70%) of such nouns do not appear as previously identified main concept words and attribute words. Recognizing head nouns in listings failing to meet these criteria is generally difficult without any semantic knowledge. Given the iterative process described herein, such listings are considered in subsequent rounds of processing as more main concept words and attribute words are identified, thereby simplifying parsing of such listings. If the current listing is not parsable, processing continues at block 818 where the next available listing is designated as the current listing and checked for parsability at block 810.

Once a parsable listing has been identified, processing continues at blocks 812 and 814 where words within the current listing are tagged as head noun words and/or modifier words, if possible. To this end, in an embodiment, various techniques may be employed. First, a word within a listing that appears as a previously identified main concept word is tagged as a head noun, whereas a word within the listing appearing as a previously identified attribute word is tagged as a modifier. That is, if a word is previously identified as a head noun or attribute, there is at least a reasonable chance that it should continue to be so labeled in the current listing. If this process does not identify a head noun in the listing, a head noun identification rule (e.g., the last noun in a first noun phrase occurring in the listing that has not been previously tagged as a modifier as augmented by exclusion of prepositional phrases, as described above) is used to tag a head noun. Finally, for a listing in which a head noun has been tagged, any remaining, untagged nouns in the listing are tagged as modifiers. As used herein, a tag applied to a word (i.e., as head noun or modifier) is relevant only to the listing in which it is applied. Thus, for example, a given word (e.g., "bed") may be tagged as a head noun in one listing and tagged as a modifier in another. Once tagging of head nouns and attributes for the current listing has been completed, processing continues at block 816 where it is determined whether there are more listings to be considered. If so, processing continues at blocks 818 and 810 as described above.

If all of the available listings have been processed (i.e., subjected to the parsing phase), processing continues at block 820, which encompasses the expansion phase noted above, where it is determined whether previously tagged head nouns and/or modifiers should be assigned as main concepts and attributes, respectively. To this end, for each word that has been previously tagged, the frequency of that word being tagged as a head noun and the frequency of that word being tagged as a modifier is determined over the entire corpus. If a word is predominately tagged as a head noun or as a modifier, then that word is assigned as a main concept or attribute, respectively. In an embodiment, this may be determined by computing a ratio of the frequency of the word being tagged as a head noun to the frequency of the word being tagged as a modifier. Thus, if the computed ratio is above a main concept threshold, e.g., 0.55, then the corresponding word is treated as a main concept. On the other hand, if the computed ratio is below an attribute threshold, e.g., 0.35, then the corresponding word is treated as an attribute. Those having ordinary skill in the art will appreciate that other thresholding schemes or threshold values may be employed for this purpose as a matter of design choice. Regardless, this process is performed over the entire corpus to make the necessary assignments, where possible.

Thereafter, processing continues at block 822 where it is determined whether a termination condition has been satisfied. In an embodiment, the termination condition may be whether, during the last iteration of blocks 808-820, any new assignments of main concept words or attribute words were made. If so, processing continues at block 808 for a new iteration of the parsing and expansion phases. Once again, those having skill in the art will appreciate that other termination conditions, e.g., a predetermined amount of iterations, could be employed for this purpose as a matter of design choice.

If the termination condition is satisfied, processing continues at block 824 where clustering according to the main concepts and attributes is performed, as described above. Thereafter, at block 826, the main concepts and attributes are provided as at least a portion of a semantic model. As desired, then, the semantic model thus created can be used to perform information extraction, at block 828, using any of a number of well know information extraction techniques. In an embodiment, information extraction based on the semantic model may be performed on one or more additional listings corpora. In this manner, it is possible to use a comparatively small (but, preferably, representative) corpus of textual listings to generate the semantic model as described above, and then use the resulting semantic model to operate upon larger corpora with greater efficiency.

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. A method comprising:
 receiving, by a processing device, a corpus of textual listings,
  textual listings, in the corpus, including text without a grammatical structure;
 tokenizing, by the processing device, each textual listing of the textual listings,
  tokenizing each textual listing including tokenizing at least one of an alphanumeric token or a token that comprises uppercase and lowercase characters;
 identifying, by the processing device, main concept words and attribute words in the corpus after tokenizing each textual listing of the textual listings,
  identifying the main concept words and the attribute words including:
   tagging, in each textual listing of the textual listings, at least one word as a head noun word based on at least one of:
    a previously identified main concept word, or
    a head noun identification rule,
   tagging, in the textual listing and after tagging the at least one word, remaining nouns as at least one modifier word, and
   assigning one word of the at least one head noun word as a main concept word and one word of the at least one modifier word as an attribute word;
 clustering, by the processing device, words in the corpus based on at least one of the main concept words or the attribute words according to at least one clustering rule, the at least one clustering rule including at least one of:
  a first rule preventing two quantitative attribute tokens from being clustered based on a frequency of appearance of the two quantitative attribute tokens in a same listing,
  a second rule preventing clustering of a quantitative attribute token with a qualitative attribute token, or
  a third rule indicating that a first token is to be clustered with a second token when characters of the first token are included in the second token; and
 providing, by the processing device and after clustering the words, the main concept words and the attribute words as at least a portion of a semantic model.

2. The method of claim 1,
 where the at least one clustering rule includes at least two of the first rule, the second rule, or the third rule.

3. The method of claim 1, where identifying the main concept words and the attribute words in the corpus further comprises:
 determining that each textual listing, of the textual listings, is parsable.

4. The method of claim 1, where tagging the at least one word as the head noun word based on the at least one of the previously identified main concept word or the head noun identification rule comprises:
 tagging the at least one word as the at least one head noun word when the at least one word matches the previously identified main concept word.

5. The method of claim 1, where tagging the at least one word as the head noun word based on the at least one of the previously identified main concept word or the head noun identification rule comprises:
 tagging the at least one word as the at least one head noun word when the at least one word is a last noun, in a first noun phrase, that has not previously been tagged as a modifier word.

6. The method of claim 1, where assigning the one word, of the at least one head noun word, as the main concept word includes:
 assigning the one word, of the at least one head noun word, as the main concept word when a ratio of a frequency of the one word, of the at least one head noun word, being tagged as a head noun word to a frequency of the one word, of the at least one head noun word, being tagged as a modifier word is greater than a main concept threshold.

7. The method of claim 1, where assigning the one word, of the at least one modifier word, as the attribute word includes:
 assigning the one word, of the at least one modifier word, as the attribute word when a ratio of a frequency of the one word, of the at least one modifier word, being tagged as a head noun word to a frequency of the one word, of the at least one modifier word, being tagged as a modifier word is less than an attribute threshold.

8. The method of claim 1, where tokenizing each textual listing of the textual listings further includes:
 tokenizing a particular textual listing, of the textual listings, to obtain a single token that includes multiple words or a dashed token that includes the multiple words.

9. The method of claim 1, further comprising:
 performing information extraction on at least another corpus of textual listings based on the semantic model.

10. An apparatus comprising:
 at least one storage device storing instructions; and
 a processor to execute the instructions to:
  receive a corpus of textual listings,
   textual listings, in the corpus, including one or more advertisements,
   the one or more advertisements including text without a grammatical structure;
  identify main concept words and attribute words in the corpus,
  when identifying the main concept words and the attribute words, the processor is to:
   tag, in each textual listing of the textual listings, at least one word as a head noun word based on at least one of:
    a previously identified main concept word, or
    a head noun identification rule, tag, in the textual listing and after tagging the at least one word, remaining nouns as at least one modifier word, and assign one word of the at least one head noun word as a main concept word and one word of the at least one modifier word as an attribute word;

cluster words in the corpus based on at least one of the main concept words or the attribute words according to at least one clustering rule, the at least one clustering rule including at least one of:
  a first rule relating to clustering two quantitative attribute tokens based on a frequency of appearance of the two quantitative attribute tokens in a same listing,
  a second rule relating to clustering of a quantitative attribute token with a qualitative attribute token, or
  a third rule relating to clustering a first token and a second token based on characters of the first token being included in the second token; and provide, after clustering the words, the main concept words and the attribute words as at least a portion of a semantic model.

11. The apparatus of claim 10, where the at least one clustering rule includes at least two of the first rule, the second rule, or the third rule.

12. The apparatus of claim 10, where, when identifying the main concept words and the attribute words in the corpus, the processor is further to:
  determine that each textual listing, of the textual listings, is parsable.

13. The apparatus of claim 10, where, when tagging the at least one word as the head noun word based on the at least one of the previously identified main concept word or the head noun identification rule, the processor is to:
  tag the at least one word as the at least one head noun word when the at least one word matches the previously identified main concept word.

14. The apparatus of claim 10, where, when tagging the at least one word as the head noun word based on the at least one of the previously identified main concept word or the head noun identification rule, the processor is to:
  tag the at least one word as the at least one head noun word when the at least one word is a last noun, in a first noun phrase, that has not previously been tagged as a modifier word.

15. The apparatus of claim 10, where, when assigning the one word of the at least one head noun word as the main concept word, the processor is to:
  assign the one word, of the at least one head noun word, as the main concept word when a ratio of a frequency of the one word, of the at least one head noun word, being tagged as a head noun word to a frequency of the one word, of the at least one head noun word, being tagged as a modifier word is greater than a main concept threshold.

16. The apparatus of claim 10, where, when assigning the one word of the at least one modifier word as the attribute word, the processor is to:
  assign the one word, of the at least one modifier word, as an attribute word when a ratio of a frequency of the one word, of the at least one modifier word, being tagged as a head noun word to a frequency of the one word, of the at least one modifier word, being tagged as a modifier word is less than an attribute threshold.

17. The apparatus of claim 10, where the processor is further to:
  tokenize words in the corpus prior to identifying the main concept words and the attribute words; and perform information extraction on at least another corpus of textual listings based on the semantic model.

18. A non-transitory computer-readable medium storing instructions, the instructions comprising:
  one or more instructions that, when executed by a processor, cause the processor to:
    receive a corpus of textual listings,
      textual listings, of the corpus of textual listings, including at least one of an advertisement or a product listing,
        the at least one of the advertisement or the product listing including text without a grammatical structure;
    identify main concept words and attribute words in the corpus,
      the one or more instructions to identify the main concept words and the attribute words including:
        one or more instructions to tag, in each textual listing of the textual listings, at least one word as a head noun word based on at least one of a previously identified main concept word or a head noun identification rule,
          the one or more instructions to tag the at least one word including one or more instructions to tag the at least one word as the at least one head noun word when the at least one word is a last noun, in a first noun phrase, that has not previously been tagged as a modifier word,
        one or more instructions to tag, in the textual listing and after tagging the at least one word, remaining nouns as at least one modifier word, and
        one or more instructions to assign one word of the at least one head noun word as a main concept word and one word of the at least one modifier word as an attribute word;
    cluster words in the corpus based on at least one of the main concept words or the attribute words according to at least one clustering rule,
      the at least one clustering rule including at least one of:
        a first rule relating to clustering two quantitative attribute tokens based on a frequency of appearance of the two quantitative attribute tokens in a same listing,
        a second rule relating to clustering of a quantitative attribute token with a qualitative attribute token, or
        a third rule relating to clustering a first token and a second token based on characters of the first token being included in the second token; and
    provide, after clustering the words, the main concept words and the attribute words as at least a portion of a semantic model.

19. The non-transitory computer-readable medium of claim 18, where the one or more instructions to assign the one word of the at least one head noun word as the main concept word comprise:
  one or more instructions to assign the one word, of the at least one head noun word, as the main concept word when a ratio of a frequency of the one word, of the at least one head noun word, being tagged as a head noun word to a frequency of the one word, of the at least one head noun word, being tagged as a modifier word is greater than a main concept threshold.

20. The non-transitory computer-readable medium of claim 18, where the one or more instructions to assign the one word of the at least one modifier word as the attribute word comprise:

one or more instructions to assign the one word, of the at least one modifier word, as an attribute word when a ratio of a frequency of the one word, of the at least one modifier word, being tagged as a head noun word to a frequency of the one word, of the at least one modifier word, being tagged as a modifier word is less than an attribute threshold.

* * * * *